（12）United States Patent
Bleiweiss

(10) Patent No.: US 8,400,454 B2
(45) Date of Patent: Mar. 19, 2013

(54) SYSTEM AND METHOD FOR CREATING MOTION BLUR

(75) Inventor: Avi I. Bleiweiss, Sunnyvale, CA (US)

(73) Assignee: ATI Technologies, Inc. (CA)

( * ) Notice: Subject to any disclaimer, the term of this patent is extended or adjusted under 35 U.S.C. 154(b) by 59 days.

(21) Appl. No.: 11/096,016

(22) Filed: Mar. 30, 2005

(65) Prior Publication Data

US 2006/0227144 A1    Oct. 12, 2006

(51) Int. Cl.
*G06T 13/00*    (2011.01)
(52) U.S. Cl. .................. 345/473; 345/474; 345/475
(58) Field of Classification Search .............. 345/418, 345/419, 425, 427, 428, 429, 430, 474, 502, 345/611, 506, 613, 422, 473, 475; 395/126, 395/130, 175
See application file for complete search history.

(56) References Cited

U.S. PATENT DOCUMENTS

| | | | | |
|---|---|---|---|---|
| 5,517,603 A | * | 5/1996 | Kelley et al. .................. 345/426 |
| 5,809,219 A | * | 9/1998 | Pearce et al. .................. 345/426 |
| 5,995,111 A | * | 11/1999 | Morioka et al. .............. 345/592 |
| 6,057,847 A | * | 5/2000 | Jenkins ......................... 345/422 |
| 6,137,492 A | * | 10/2000 | Hoppe .......................... 345/420 |
| 6,211,882 B1 | | 4/2001 | Pearce et al. |
| 6,426,755 B1 | * | 7/2002 | Deering ........................ 345/581 |
| 6,483,514 B1 | * | 11/2002 | Duff ............................. 345/474 |
| 6,654,020 B2 | * | 11/2003 | Mori ............................ 345/475 |
| 6,925,210 B2 | * | 8/2005 | Herf ............................. 382/264 |
| 6,967,663 B1 | * | 11/2005 | Bastos et al. ................. 345/613 |
| 2003/0234789 A1 | * | 12/2003 | Gritz ............................ 345/474 |
| 2005/0243094 A1 | * | 11/2005 | Patel et al. ................... 345/506 |

* cited by examiner

*Primary Examiner* — Jeffrey Chow
(74) *Attorney, Agent, or Firm* — Volpe and Koenig, P.C.

(57) ABSTRACT

An embedded, programmable motion blur system and method is described herein. Embodiments include applying displacement on a vertex level and amplification on a primitive level within a graphics pipeline. Embodiments include receiving a plurality of vertices in a first component of a graphics processing unit (GPU), displacing each of the plurality of vertices, receiving a primitive that includes at least one of the displaced vertices in a second component of the GPU, and transforming the primitive. In one embodiment, transforming comprises at least one of translation, scaling, and rotation. Further included are generating a plurality of primitive samples over a time aperture, and outputting the plurality of primitive samples to further components of the GPU for further processing for display of the scene with motion blur.

18 Claims, 4 Drawing Sheets

SYSTEM AND METHOD FOR CREATING MOTION BLUR

TECHNICAL FIELD

The invention is in the field of graphics processing.

BACKGROUND

Motion blur is an effect seen in photographs taken of a moving object. A camera exposes a sheet of light sensitive film to a scene for a short period of time. The light from the scene hits the film, reacts with the chemicals in the film, and results in the eventual photograph. If the scene changes during the previously described exposure, a blurred image results. Motion blur is present in most films and television programs, and may not be very noticeable, but its presence lends a realistic feeling. In computer animation, it is often desirable to create an effect that is as close to a filmed scene as possible. The absence of motion blur in computer animations is noticeable and makes the animation seem unrealistic. For example, fast movement in an animation that has no motion blur is jerky.

Various techniques have been devised to include motion blur in computer animated scenes. For example, to create motion blur in animated scenes, many additional frames are rendered than previously for display over a particular time period, so that the jerkiness of movement from frame to frame can be smoothed out. However, current techniques for including motion blur in animated scenes have significant limitations. In general, current motion blur techniques do not provide both good quality, and acceptable interaction and efficiency.

FIG. 1 is a block diagram of one traditional post rendering motion blur technique 100. Technique 100 involves a graphics processing unit (GPU) 102 and a software application 104. The software application communicates with a host processor (not shown) and a memory (not shown) in a system. The memory may be shared with other components or functions. The memory includes an accumulation buffer that is used by the application 104. Technique 100 performs scene processing and multi-pass rendering to generate additional samples of scene objects. A scene is rendered, or drawn, in a time t, then another is drawn in a time t+1, t+2, etc. The times define an aperture period, which is analogous to the time a camera aperture is open and exposed to a scene. The rendered scenes are superimposed one on another over the aperture period. The scene thus obtains some motion blur.

Technique 100 executes one rendering pass per image space sample, requiring tens of samples to achieve minimally acceptable quality, and is thus slow. Technique 100 is also fairly limited in its ability to improve motion blur quality. For example, technique 100 is especially limited in it transformation capability. Technique 100 is further limited to applying motion blur in a single direction conforming to a predefined vector.

Technique 100 also potentially imposes a computation burden. If it desirable to apply the application 104 to every scene, the entire process of rendering must be repeated many times, complicating the application 104 because the application program must manage all of the image processing and also display the images. Also, the application 104 takes an object like a sphere, and essentially moves it in space as a whole. Then each reproduced sample is tessellated into triangles and fed to the GPU 102, impacting other graphics processing. The size of the accumulation buffer is a further constraint on the speed and quality of technique 100. In addition, the accumulation buffer draws excess GPU fame buffer resources, trading off desired locality of textures in memory.

FIG. 2 is a block diagram of one traditional pre-rendering motion blur technique 200. Technique 200 involves a graphics processing unit (GPU) 202 and a software application 204. The software application communicates with a host processor (not shown) and a memory (not shown) in a system. The memory may be shared with other components or functions. Technique 200 performs scene processing, and to apply motion blur, geometry amplification. Technique 200 preserves more sample details as compared to technique 100. However, technique 200 imposes geometry amplification at the top of the graphics processing pipeline in the host processor, hence limiting graphics feature orthogonality, consuming additional time, and overloading the host processor to GPU bandwidth. The GPU 202 is required to perform unnecessary computations on a large number of vertices coming into it. As a consequence of these considerations, technique 200 is especially limited to applying motion blur to simple objects.

Techniques 100 and 200 are examples of prior techniques which are demanding of resources including memory and processing bandwidth. Prior techniques are forced to constrain the use of motion blur to limited transformation and/or application to simplified objects, such as spheres.

Because motion blur is traditionally controlled by a software applications which interface with fixed functionality in a GPU, known techniques suffer scalability in the presence of other graphics features, and place an additional burden on the human graphics programmer.

DETAILED DESCRIPTION

An embedded, programmable motion blur system and method is described herein. Embodiments include applying displacement on a vertex level and amplification on a primitive level within a graphics pipeline. Embodiments described herein provide more accurate motion blur functionality with improved scalability inside a graphics pipeline. The motion blur functionality is completely orthogonal to other graphics features. In addition, embodiments described herein do not overburden an existing graphics application or existing memory capacity.

One embodiment of a technique as described herein applies motion blur to any type of object, which is pre-tessellated into triangles. The transformation of the object from its initial position to its aperture extent is relatively generic, and includes, but is not limited to, translation, scaling, and rotation. Other types of transformations may also be employed in this or other embodiments of the present invention. Embodiments execute motion blur in the middle of the graphics processing pipeline, providing a significant improvement in graphics feature scalability and orthogonality. For example, both displaced and non-displaced geometries are treated similarly with regard to motion blur. Also, object (e.g. triangle) samples along the motion vector may adaptively be assigned a transparency value, based on time.

Figure 1:
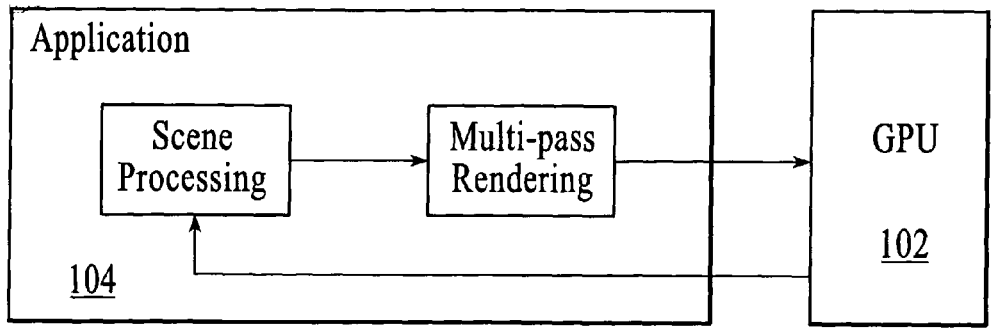
FIG. 1 is a block diagram of a prior art post rendering motion blur technique.
Figure 2:
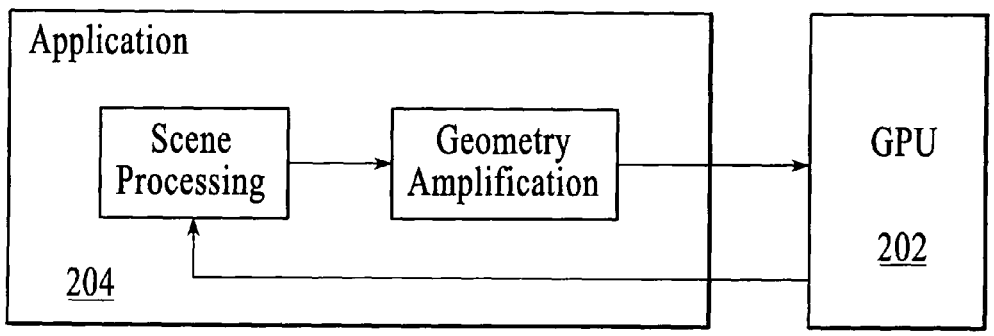
FIG. 2 is a block diagram of a prior art pre-rendering motion blur technique.
Figure 3:
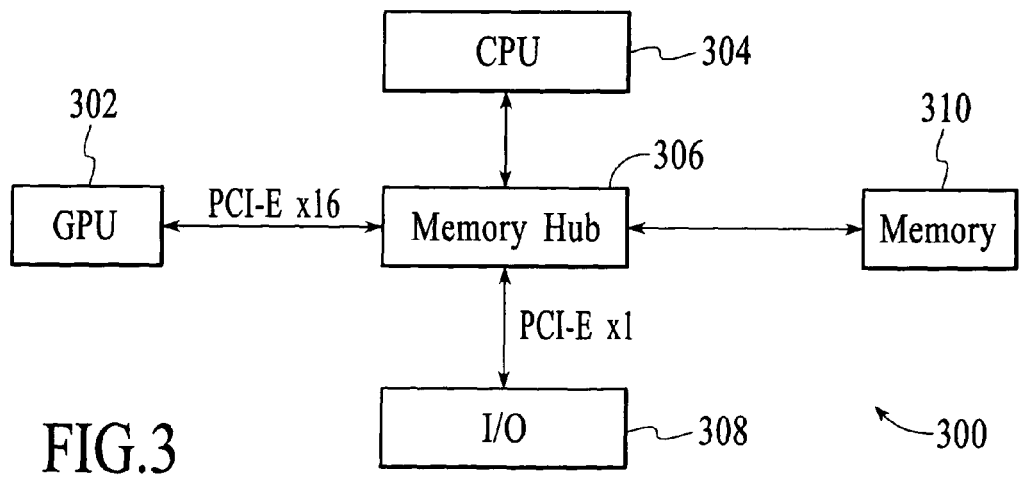
FIG. 3 is a block diagram of a system including a graphics processing unit (GPU) according to an embodiment.

FIG. 3 is a block diagram of a system 300 including a graphics processing unit (GPU) 302 according to an embodiment. System 300 includes a central processing unit (CPU) 304, also referred to as a host processor. The CPU 304 communicates with a memory 310, an input/output (I/O) unit 308 and GPU 302 via a memory hub 306. The memory 310 includes memory usable by the GPU 302 and other components of the system 300. The GPU 302 also includes various resources (not shown) including local memory, or graphics memory that is local to the GPU 302. The memory hub 306 communicates with various system 300 components via one or more peripheral component interface (PCI)-express (PCI-E) buses. In various embodiments, one or more of the referenced components can be replicated, for example such that there are multiple GPUs 302 in the system 300.

Figure 4:
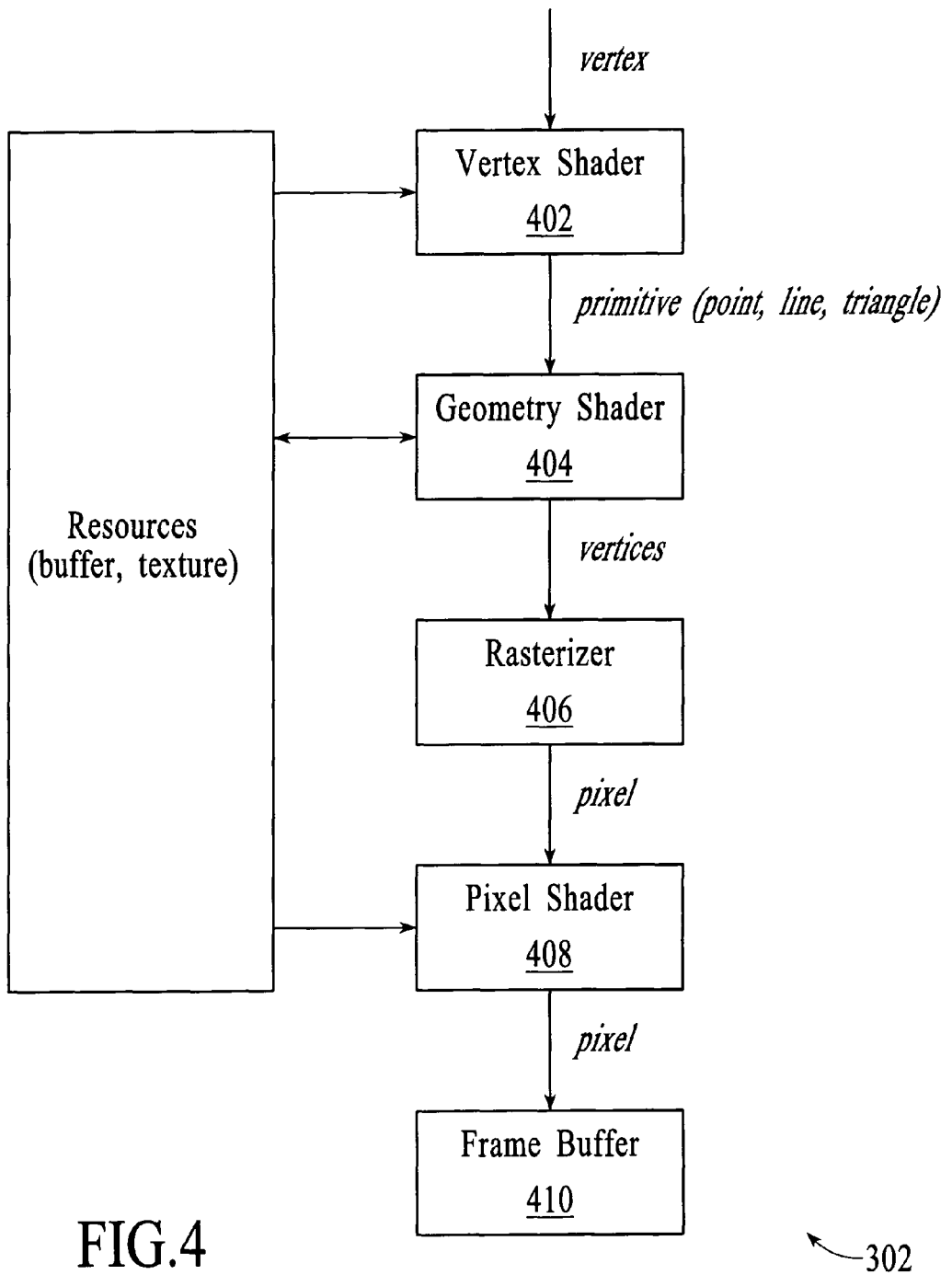
FIG. 4 is a block diagram of the GPU of FIG. 3 according to an embodiment.

FIG. 4 is a block diagram of the GPU 302 according to an embodiment. The GPU 302 includes various hardware and software components to provide specialized processing of graphics data. The GPU 302 is flexibly programmable to process data to produce a variety of results. The GPU 302 includes a vertex shader 402, a geometry shader 404, a rasterizer 406, a pixel shader 408, and a frame buffer 410. The GPU 302 also includes resources 412, including buffer resources and texture resources. The vertex shader 402, the geometry shader 404, and the pixel shader 408 use the resources 412 to store shared data.

In various embodiments, one or more of the referenced elements may be replicated, for example such that there are multiple geometry shaders 404 in the GPU 302. The replication may be effected by programming hardware to duplicate functionality, by duplication of hardware, or any combination of the two.

The vertex shader receives a vertex as input and outputs a vertex. A vertex may have multiple attributes, including but not limited to position, normal, color, and texture coordinate (for example, an image can be applied later using the coordinate). In an embodiment that creates motion blur in a scene as described herein, the vertex shader applies displacement. For example, the vertex received represents a vertex in a scene that is being processed by the GPU 302. The output vertex is the same vertex, but programmably transformed, including displacement.

Figure 5A:
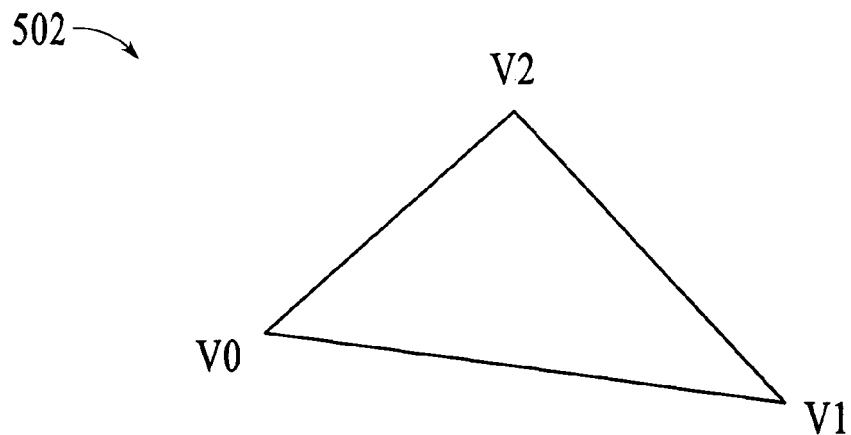
FIG. 5A is a diagram of a triangle with vertices V0, V1 and V2 as input to the geometry shader of an embodiment.

The geometry shader 404 is a programmable unit that accepts primitives, such as, for example, a point, line, triangle or other polygon as input. Primitives are input to the geometry shader in the form of vertices, e.g. a single vertex for point, two vertices for a line, or three vertices for a triangle. Optionally, the geometry shader 404 may also receive the vertex data for the edge-adjacent primitives, e.g., an additional two vertices for a line, and an additional three vertices for a triangle. While the vertex shader is a one-to-one process (one vertex in and one vertex out) the geometry shader is a one-to-many process, receiving one primitive and outputting many primitives. In one embodiment, the geometry shader performs one-to-many triangle mapping, and thus provides geometry amplification within the graphics pipeline. As an example, FIG. 5A shows a triangle 502 with vertices V0, V1 and V2.

The vertices of triangle 502 are input to the geometry shader 404. The geometry shader runs application-specified shader code that generates vertices for output. Embodiments of the motion blur method described herein use a triangle such as triangle 502 as input to the geometry shader 404.

Figure 5B:
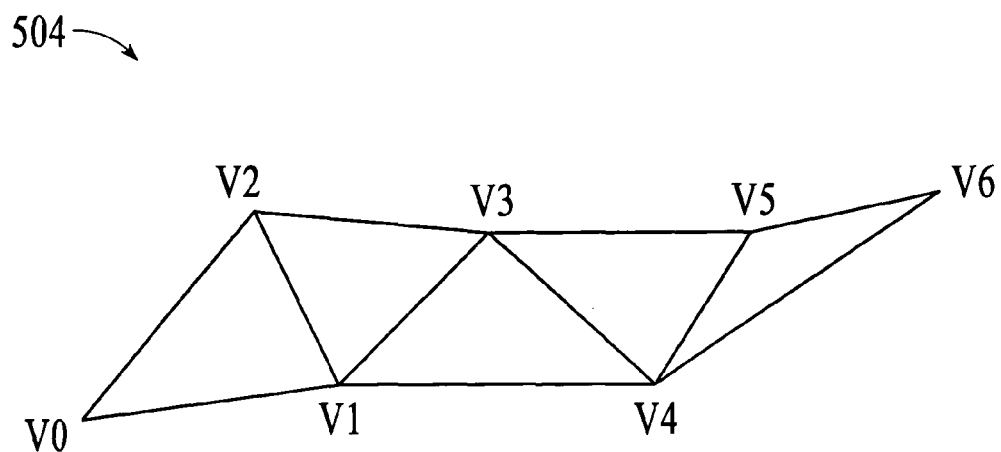
FIG. 5B is a diagram of multiple triangles as output by the geometry shader of an embodiment.

FIG. 5B is diagram of an output topology for the geometry shader 404 according to an embodiment. The geometry shader 404 is capable of outputting multiple vertices forming a single selected topology. Some geometry shader 404 output topologies available are triangle-strip, line-strip and point list, but the embodiment is not necessarily so limited. FIG. 5B is a diagram of a triangle-strip topology 504 according to an embodiment. The vertices V0, V1, and V2 are present, as well as vertices V3, V4, V5, and V6. The strip topology 504 provides for the reuse of vertices for increased efficiency. For example, a first triangle is formed of vertices V0, V1, and V2, another triangle is formed of V1, V3, and V2, another triangle is formed of V1, V4, and V3, and so on. An N-vertices strip form surface yields N–2 triangles.

The number of primitives output by the geometry shader 404 can vary freely within any invocation of the geometry shader 404, though the maximum number of vertices that can be emitted may be declared statically in the shader code beforehand. Strip topology lengths output from an invocation of the geometry shader 404 can be arbitrary. The geometry shader 404 code utilizes two primary topology statements: emit and cut. Each emit statement produces one vertex at the output. A cut statement indicates a break in a strip topology, and a new start for a primitive. An embodiment of motion blur shader code as further described below runs on the geometry shader 404 and generates a known number of triangles on the output. The output triangles are disjoint, and hence a cut statement takes place for every three vertices emitted.

The output of the geometry shader 404 may be fed to the rasterizer 406 and/or out to a resource buffer in memory 412. Output fed to memory 412 is expanded to individual point/line/triangle lists. Output fed to the rasterizer 406 is also expanded to individual point/line/triangle lists.

In one embodiment the geometry shader 404 includes various levels of software to perform processing including, geometry processing, and vertex processing. The levels of software include high-level shader language (HLSL), and Open GL Shading Language (GLSL). HLSL and GLSL are high-level shading languages that can be analogized to high-level languages such as C++. In an embodiment, the high-level shading languages are compiled into the hardware of the GPU 302 to provide more efficiency, speed, flexibility and capability, including embedded or integrated motion blur capability.

Referring again to FIG. 4, the rasterizer 406 receives the amplified primitives that are output from the geometry shader 404. The rasterizer 406 prepares an image for display or printing according to known methods.

The pixel shader 408 receives the output of the rasterizer 408. A pixel shader is a graphics function that calculates effects on a per-pixel basis as known in the art.

The frame buffer 410 receives the output of the pixel shader 408.

Figure 6A:
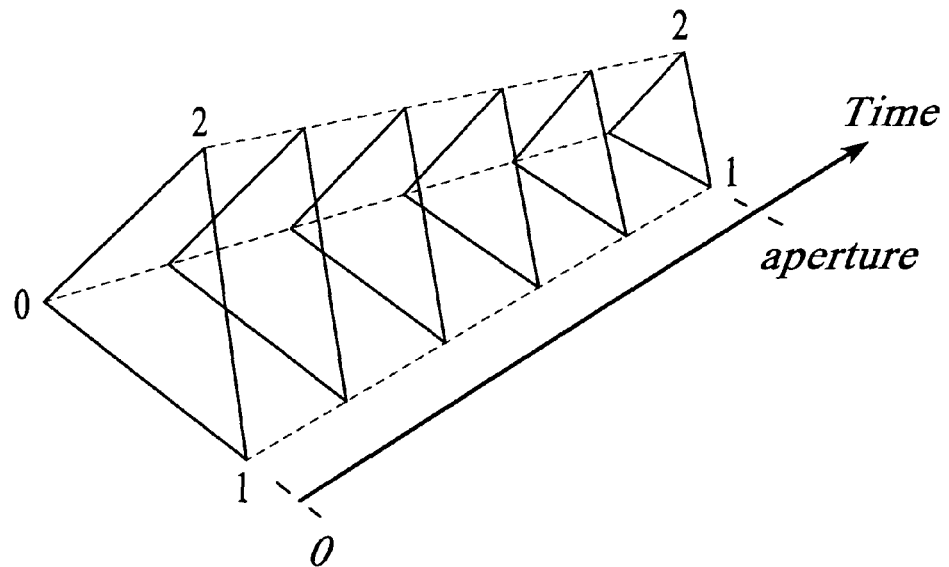
FIG. 6A is a diagram of a triangle as it is linearly transformed from time 0 to time aperture according to an embodiment.
Figure 6B:
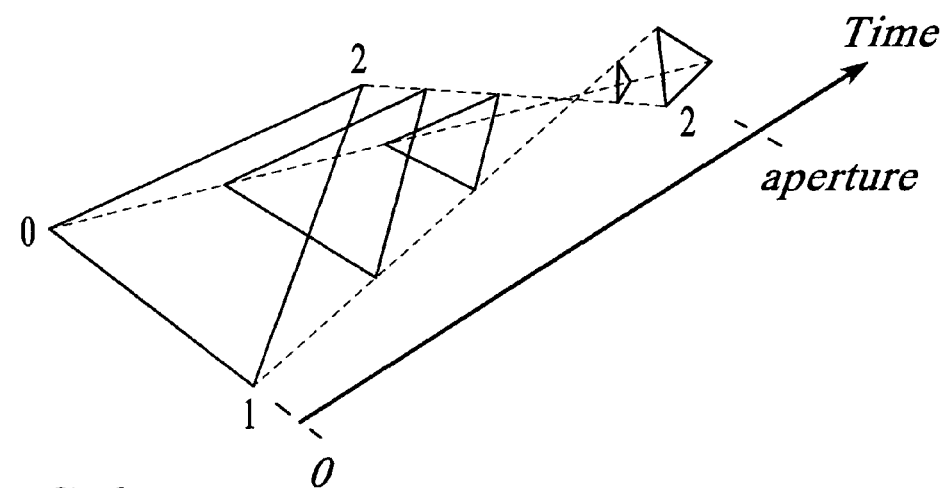
FIG. 6B is a diagram of a triangle as it is linearly transformed from time 0 to time aperture according to an embodiment including two convex hulls.

An algorithm for creating motion blur with the geometry shader 404 according to an embodiment will now be described with reference to FIGS. 6A and 6B. FIG. 6A is a diagram of a triangle as it is linearly transformed from time 0 to time aperture according to an embodiment. Time 0 is the time at which a hypothetical camera aperture opens on a scene, and time aperture is the time at which the hypothetical camera aperture closes. A triangle with vertices V0, V1 and V2 is input to the geometry shader 404 at time 0. The dotted lines form a volume that is called the convex hull. There can also be two convex hulls. FIG. 6B is a diagram of two convex hulls defined by a triangle as it is linearly transformed from time 0 to time aperture.

Referring again to FIG. 6A, the triangles interposed between time 0 and time aperture are samples that show the intermediate triangles between time 0 and time aperture. The compiled shading code to execute on the geometry shader includes first triangle transformation information regarding transformations the triangle undergoes over the time period from time 0 to time aperture. The geometry shader uses the information to perform operations on the input triangle, including translation, scaling, and rotation.

The geometry shader 404 linearly transforms the input triangle to obtain its position and orientation at time aperture. Then, the convex hull is obtained from the triangle at time 0 and the triangle at time aperture. The geometry shader 404 constructs the triangle samples in the delimited convex hull at programmable intervals. The input triangle, samples and the triangle at aperture time are output to the rasterizer 406.

Current software applications are not able to perform translation, scaling, and rotation as described because of prohibitive efficiency costs. Current software applications also avoid applying motion blur on a primitive (e.g., triangle) basis for the reasons previously mentioned. Current software application solutions to motion blur are limited to avoid prohibitively or unacceptably slow interaction speed. Embodiments of the invention can apply motion blur to different objects in a same field moving in different direction, for example by assigning processing of one object to one geometry shader, and assigning processing of the other object to another geometry shader.

Motion blur pseudo code for execution by the geometry shader 404 according to an embodiment is shown below.

```
// globals
uniform float numSamples;
uniform float4x4 mTransform;
struct VI {
    float4 Pos      : SV_POSITION;
    float4 Col[2]   : COLOR;
    float2 Tex      : TEXCOORD;
};
struct VO {
    float4 Pos      : SV_POSITION;
    float4 Col[2]   : COLOR;
    float2 Tex      : TEXCOORD;
};
[EmitType [triangle VO]]
[MaxVertexCount [3*numSamples]]
void
motionblur(triangle VI in[3])
{
    // transform incoming triangle to a triangle in time =
aperture
    VI aperture[3];
    for(int i = 0; i < 3; i++)
       aperture[i] = mult(in[i], mTransform);
    // derive triangle samples in the convex hull formed
by
    // incoming/aperture triangle
    VI samples[numSamples][3];
    // compute respective input-to-aperture vertex
    distances and      // derive sample separation
    float d[3];
    for(int i = 0; i < 3; i++)
       d[i] = distance(in[i].Pos, aperture[i].Pos) /
    numSamples;
    // compute line equation for input-to-aperture
    connection
    float k0[3], k1[3], k2[3];
    for(int i = 0; i < 3; i++) {
       k0[i] = aperture[i].Pos.x - in[i].Pos.x;
       k1[i] = aperture[i].Pos.y - in[i].Pos.y;
```

```
       k2[i] = aperture[i].Pos.z - in[i].Pos.z;
    }
    // compute triangle sample vertices based on
    connecting line      // equation and input-to-aperture
    separation distance
    for(int j = 0; j < numSamples; i++) {
      for(int i = 0; i < 3; i++) {
         samples[j][i].Pos =
getPoint(k0[i],k1[i],k2[i],j*d[i]);
      }
    }
}
```

Aspects of the invention described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices and standard cell-based devices, as well as application specific integrated circuits (ASICs) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other systems, not only for the system including graphics processing as described above.

For example, a blurred image produced as described herein may be output to a variety of display devices, including computer displays that display moving pictures and printers that print static images.

The various operations described may be performed in a very wide variety of architectures and distributed differently than described. As an example, in a distributed system a server may perform some or all of the rendering process.

In other embodiments, some or all of the hardware and software capability described herein may exist in a printer, a camera or some other device. The motion blur techniques described herein may be applied as part of a process of constructing complete polygonal structures or geometries (e.g., including light parameters, etc.) from a video sequence. The geometries are then processed as described herein to include motion blur.

The elements and acts of the various embodiments described above can be combined to provide further embodiments. These and other changes can be made to the invention in light of the above detailed description.

In general, in the following claims, the terms used should not be construed to limit the motion blur method and system to the specific embodiments disclosed in the specification and the claims, but should be construed to include any processing systems that operate under the claims to provide motion blur processing. Accordingly, the motion blur method and system is not limited by the disclosure, but instead the scope of the motion blur method and system is to be determined entirely by the claims.

While certain aspects of the method and apparatus for motion blur processing are presented below in certain claim forms, the inventors contemplate the various aspects of the method and apparatus for motion blur processing in any number of claim forms. For example, while only one aspect of the method and apparatus for motion blur processing may be recited as embodied in computer-readable medium, other aspects may likewise be embodied in computer-readable medium. Accordingly, the inventors reserve the right to add additional claims after filing the application to pursue such additional claim forms for other aspects of the method and apparatus for motion blur processing.

What is claimed is:

1. A method for creating motion blur in a computer-generated scene, the method comprising:
   receiving a plurality of vertices in a first component of a graphics processing unit (GPU), wherein the plurality of vertices is included in a scene in which motion blur is to be created, wherein the plurality of vertices defines one or more primitives, each of the primitives including more than one pixel, the primitives comprising at least one of: a point, a line, a triangle or a polygon;
   displacing at least one vertex of the plurality of vertices;
   receiving, in a second component of the GPU, a particular primitive defined by at least one of the displaced vertices, the particular primitive having an initial position;
   generating a plurality of primitive samples from the particular primitive by performing operations on the particular primitive including translation, scaling, and rotation, wherein a last one of the generated primitive samples has an aperture extent position and wherein each of the remaining generated primitive samples has a position between the initial and aperture extent positions;
   wherein the receiving of a plurality of vertices, displacing, receiving a particular primitive, and generating are all performed prior to rendering of the scene.

2. The method of claim 1, wherein generating the plurality of primitive samples further includes delimiting at least one convex hull based on the initial and aperture extent positions.

3. The method of claim 2, wherein generating the plurality of primitive samples further includes constructing the plurality of primitive samples in the delimited convex hull at programmable intervals.

4. The method of claim 1, wherein the particular primitive is a triangle defined by three vertices.

5. A method for creating motion blur in a computer generated scene, wherein the scene includes multiple objects moving in different directions, the method comprising:
   receiving a first plurality of vertices in a first vertex shader, wherein the first plurality of vertices corresponds to a first object traveling in a first direction in a scene in which motion blur is to be created;
   displacing at least one first vertex of the first plurality of vertices;
   receiving, in a first geometry shader, a first primitive that includes more than one pixel and includes at least one of the displaced first vertices, the first primitive having a first initial position;
   generating a plurality of first primitive samples from the first primitive by performing operations on the first primitive including translation, scaling, and rotation, wherein a last one of the first primitive samples has a first aperture extent position, and wherein each of the remaining first primitive samples has a position between the first initial position and the first aperture extent position;
   receiving a second plurality of vertices in a second vertex shader, wherein the second plurality of vertices corresponds to a second object traveling in a second direction in the scene;
   displacing at least one second vertex of the second plurality of vertices;
   receiving, in a second geometry shader, a second primitive that includes more than one pixel and includes at least one of the displaced second vertices, the second primitive having a second initial position;
   generating a plurality of second primitive samples from the second primitive by performing operations on the second primitive including translation, scaling, and rotation, wherein a last one of the second primitive samples has a second aperture extent position, and wherein each of the remaining second primitive samples has a position between the second initial position and the second aperture extent position;
   wherein the receiving of the first and second pluralities of vertices, the displacing of the at least one first and at least one second vertices, the receiving of the first and the second primitives, and the generating of the pluralities of the first and second primitive samples, are performed prior to rendering of the scene.

6. A graphics processing system configured to create motion blur in a scene, comprising:
   a central processing unit (CPU);
   a memory unit coupled to the CPU;
   at least one programmable graphics processing unit (GPU) coupled to the CPU and to the memory, wherein the at least one GPU includes:
      at least one vertex shader, programmable to receive an input vertex that is present in a scene, and to output a displaced vertex before the scene is rendered; and
      at least one geometry shader, wherein the geometry shader is programmable to:
         perform geometry amplification of a received primitive, wherein the received primitive is defined by at least one displaced vertex, the received primitive comprising a point, a line, a triangle or a polygon the received primitive including more than one pixel, the received primitive having an initial position, and transform the received primitive, the transforming including generating a plurality of primitive samples so as to create motion blur in the scene, the generating comprising performing operations on the received primitive including translation, scaling, and rotation, wherein a last one of the generated primitive samples has an aperture extent position and wherein each of the remaining generated primitive samples has a position between the initial position and the aperture extent position;

wherein the performing of geometry amplification and the transforming of the received primitive are performed before the scene is rendered.

7. The system of claim 6, wherein the geometry shader is further programmable to generate the plurality of primitive samples by delimiting at least one convex hull based on the first and second positions.

8. The system of claim 7, wherein the geometry shader is further programmable to generate the plurality of primitive samples by constructing the plurality of primitive samples in the delimited convex hull at programmable intervals.

9. The system of claim 6, wherein the received primitive is a triangle defined by three vertices.

10. The system of claim 6, further comprising a rasterizer coupled to receive the displaced and amplified primitives.

11. The system of claim 10, further comprising a pixel shader coupled to receive an output of the rasterizer.

12. The system of claim 11, further comprising a frame buffer coupled to the pixel shader for storing frames to be displayed.

13. A graphics processing system programmable to process a scene including multiple objects moving in different directions, the system comprising:
  a first vertex shader programmable to:
    receive a first plurality of vertices, wherein the first plurality of vertices corresponds to a first object traveling in a first direction in a scene in which motion blur is to be created; and
    displace at least one first vertex of the first plurality of vertices;
  a first geometry shader programmable to:
    receive a first primitive that includes more than one pixel and includes at least one of the displaced first vertices, the first primitive having a first initial position; and
    generating a plurality of first primitive samples from the first primitive by performing operations on the first primitive including translation, scaling, and rotation, wherein a last one of the first primitive samples has a first aperture extent position, and wherein each of the remaining first primitive samples has a position between the first initial position and the first aperture extent position;
  a second vertex shader programmable to:
    receive a second plurality of vertices, wherein the second plurality of vertices corresponds to a second object traveling in a second direction in the scene; and
    displace at least one second vertex of the second plurality of vertices;
  a second geometry shader configured to:
    receive a second primitive that includes more than one pixel and includes at least one of the displaced second vertices, the second primitive having a second initial position; and
    generate a plurality of second primitive samples from the second primitive by performing operations on the second primitive including translation, scaling, and rotation, wherein a last one of the second primitive samples has a second aperture extent position, and wherein each of the remaining second primitive samples has a position between the second initial position and the second aperture extent position;
  the system further programmable to output the plurality of first primitive samples and the plurality of second primitive samples before the scene is rendered to components of a graphics processing unit (GPU) for further processing of the scene for display with motion blur.

14. A non-transitory computer-readable medium having stored thereon instructions which, when executed, cause the creation of motion blur in an animated scene, the instructions including:
  receiving a plurality of vertices in a first component of a graphics processing unit (GPU), wherein the plurality of vertices is included in a scene in which motion blur is to be created, wherein the plurality of vertices defines one or more primitives, each of the primitives including more than one pixel, wherein the primitives comprise at least one of: a point, a line, a triangle or a polygon;
  displacing at least one vertex of the plurality of vertices;
  receiving a primitive defined by at least one of the displaced vertices in a second component of the GPU, the particular primitive having an initial position;
  generating a plurality of primitive samples from the primitive by performing operations on the primitive including translation, scaling, and rotation, wherein a last one of the generated primitive samples has an aperture extent position and wherein each of the remaining generated primitive samples has a position between the initial and aperture extent positions; and
  outputting the plurality of primitive samples before the scene is rendered to further components of the GPU for display of the scene with motion blur.

15. The non-transitory computer-readable medium of claim 14, wherein generating the plurality of primitive samples further includes delimiting at least one convex hull based on the initial and aperture extent positions.

16. The non-transitory computer-readable medium of claim 15, wherein generating the plurality of primitive samples further includes constructing the plurality of primitive samples in the delimited convex hull at programmable intervals.

17. The non-transitory computer-readable medium of claim 14, wherein the primitive is a triangle defined by three vertices.

18. A non-transitory computer-readable medium having stored thereon instructions which, when executed by a general processing unit (GPU), cause the creation of motion blur in an animated scene, wherein the scene includes multiple objects moving in different directions, and wherein the GPU includes at least one vertex shader component and at least one geometry shader component, the instructions comprising:
  receiving a first plurality of vertices in a first vertex shader, wherein the first plurality of vertices corresponds to a first object traveling in a first direction in a scene in which motion blur is to be created;
  displacing at least one first vertex of the first plurality of vertices;
  receiving, in a first geometry shader, a first primitive that includes more than one pixel and includes at least one of the displaced first vertices, the first primitive having a first initial position, wherein the first primitive comprises at least one of: a point, a line, a triangle or a polygon;

generating a plurality of first primitive samples from the first primitive by performing operations on the first primitive including translation, scaling, and rotation, wherein a last one of the first primitive samples has a first aperture extent position, and wherein each of the remaining first primitive samples has a position between the first initial position and the first aperture extent position;

receiving a second plurality of vertices in a second vertex shader, wherein the second plurality of vertices corresponds to a second object traveling in a second direction in the scene;

displacing at least one second vertex of the second plurality of vertices;

receiving, in a second geometry shader, a second primitive that includes more than one pixel and includes at least one of the displaced second vertices, the second primitive having a second initial position;

generating a plurality of second primitive samples from the second primitive by performing operations on the second primitive including translation, scaling, and rotation, wherein a last one of the second primitive samples has a second aperture extent position, and wherein each of the remaining second primitive samples has a position between the second initial position and the second aperture extent position; and outputting the plurality of first primitive samples and the plurality of second primitive samples before the scene is rendered to further components of the GPU for further processing of the scene for display with motion blur.

* * * * *